United States Patent [19]
Melandri

[11] 3,871,272
[45] Mar. 18, 1975

[54] INTENSIVE WINE-MAKING PROCESS AND THE RELATIVE PLANT FOR CARRYING IT OUT

[75] Inventor: Rino Melandri, Lugo, Italy

[73] Assignee: Diemme S.N.C., Lugo, Italy

[22] Filed: Nov. 6, 1972

[21] Appl. No.: 303,924

[30] Foreign Application Priority Data

Nov. 30, 1971 Italy..............................46927
July 27, 1972 Italy..............................46899

[52] U.S. Cl................................ 99/276, 259/95
[51] Int. Cl............................. C12b 1/02, C12g 1/06
[58] Field of Search.......... 99/275, 276, 277, 277.1, 99/277.2; 259/95; 134/176; 415/196; 195/128, 132, 133, 143

[56] References Cited
UNITED STATES PATENTS

| | | | |
|---|---|---|---|
| 1,447,305 | 3/1923 | Hauk | 134/176 |
| 1,952,179 | 3/1934 | Milkowski | 415/196 |
| 2,987,260 | 6/1961 | Sasnett | 134/176 |
| 3,149,574 | 9/1964 | Mill | 415/197 |
| 3,155,045 | 11/1964 | Lown | 415/197 |

*Primary Examiner*—Robert W. Jenkins
*Attorney, Agent, or Firm*—Brisebois & Kruger

[57] ABSTRACT

The wine making process comprises the maceration stage taking place at an intensive rate, due to the continuous and violent recycling of the must over the pressed grape dregs. The plant for carrying out the process comprises a vat; a torque flow pump connected by means of a pipe provided with a valve, to the base of the vat; a sprayer with differentiated arms, rotating by reaction, situated in the top part of the vat and connected to the pump outlet.

7 Claims, 5 Drawing Figures

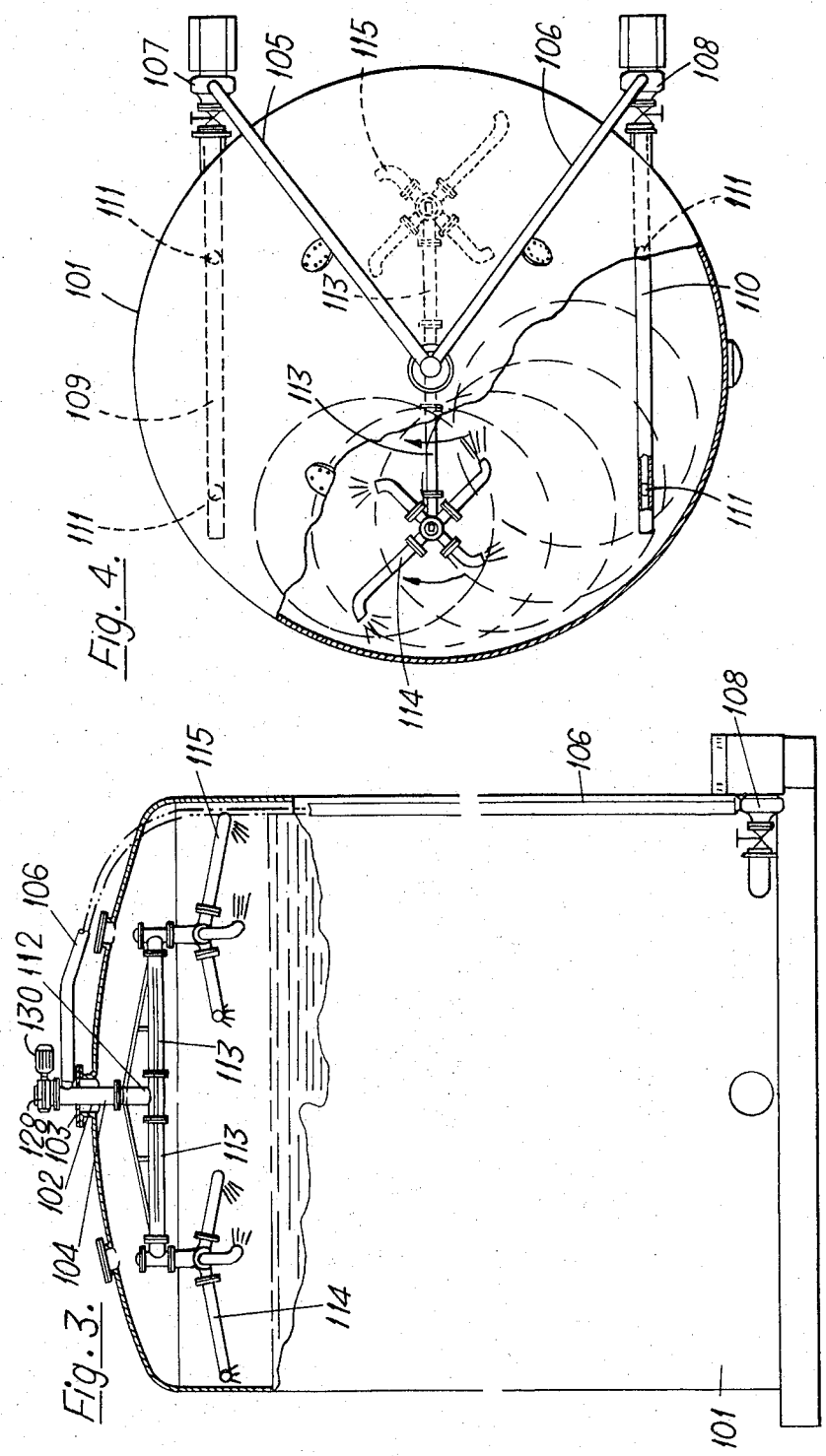

INTENSIVE WINE-MAKING PROCESS AND THE RELATIVE PLANT FOR CARRYING IT OUT

SUMMARY OF THE INVENTION

The process of transforming grape must into wine comprises two fundamental stages, the first consisting of macerating the grape stones and skins in the must until they have given up to the liquid a sufficient quantity of colour and salts; the second consisting of fermenting the must during which a large part of the sugar is transformed into alcohol with considerable heat development.

In the most antiquated processes the two said stages take place in one container or vat with considerable disadvantages.

After a certain time the dregs of pressed grapes which have a smaller gravity then the liquid tend to float and group together at the top of the vat where they form the so-called head, and in the meantime fermentation begins.

Because of this there is no longer good contact between the liquid and the dregs of pressed grapes and the colour is not given up completely; moreover the presence of solid bodies on the must gives rise to such high fermentation temperatures that in the hottest countries the fermentation may be considerably damaged.

Finally the separate extraction of the wine and head gives rise to considerable practical difficulties deriving largely from the need for a man to enter the vat in order to complete the extraction of the pressed grape dregs. The presence in it of carbon dioxide and other gases makes the presence of the man extremely dangerous. More modern processes offer various partial solutions to the aforementioned disadvantages.

In some processes fermentation takes place in the traditional manner, whereas the extraction of the dregs of pressed grapes is completely mechanised; in other processes the maceration stage takes place first together with the initial fermentation at high temperature, and later the liquid is separated and left to ferment alone at lower temperatures.

In these latter processes, during the maceration stage there is a partial recycling of the must over the pressed grape dregs in order to improve the giving up of colour; moreover the extraction of the pressed grapes dregs is made together with the liquid by means of high throughput pumps after the head of pressed grape dregs has been crushed at the end of maceration, and separation of the liquid from the pressed grape dregs takes place in a suitable apparatus termed a "trickle press."

These processes partly resolve the stated problems but are not very efficient during the maceration stage which has to be prolonged in time with the consequence that the operation of separating and transferring the liquid takes place when the fermentation is already advanced, and therefore at high temperature, and part of the alcohol already produced disperses in it. Moreover these processes require fixed non-reversible plant, located on specially constructed vats, and it would be difficult to construct them on already existing vats.

The object of the present invention is a new wine making process comprising the three operations of maceration, trickle pressing and fermentation carried out in substantially distinct stages, in which the operation of macerating the pressed grape dregs in the must takes place at an intensive rate and hence in a very short time and in a complete manner, and consequently it terminates when fermentation is still in the initial stage and enables transfer and separation of the liquid from the pressed grape dregs to be made at low temperature and without wastage of alcohol.

To this end said process comprises the complete and fast recycling of the must in the maceration stage, and a plant for carrying out said process comprises a torque flow pump of very high throughput and head, a reaction sprayer with differentiated arms situated at the top of the vat, and a high throughput duct which connects the bottom of the vat to the pump inlet and the pump outlet to said sprayer, as will be more precisely explained in the following detailed description.

This plant may serve a number of adjacent vats alternately, and may be easily adapted to existing vats.

A series of tests has shown that with the said process, in addition to completely resolving the stated disadvantages generally connected with wine making, the product obtained has considerably improved organolectic properties, and the colour extracted from the pressed grape dregs increases from 10 to 40 percent with respect to existing plant and the process time reduces by about 20 percent.

The merits and functional and constructional characteristics of the invention will be more evident from the following detailed description referring to the accompanying drawings, and relates to different practical embodiments of the invention given by way of non-limiting example.

FIG. 3 is a partially sectional side view of an improved version of the plant.

FIG. 4 is a plan view of the plant shown in FIG. 3.

Figure 1:
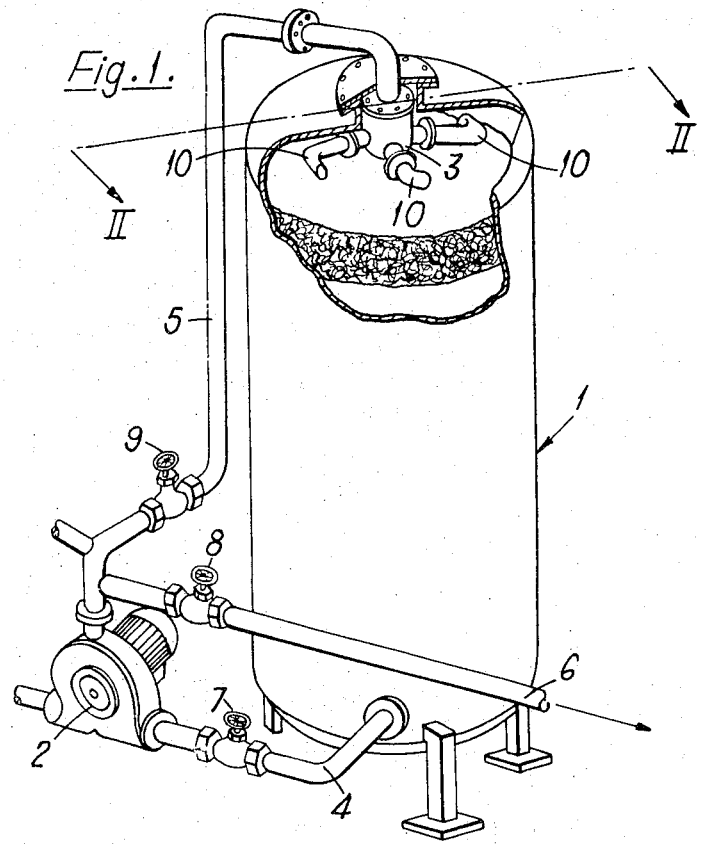
FIG. 1 is a partially sectional perspective view of a simplified design of the plant.
Figure 2:
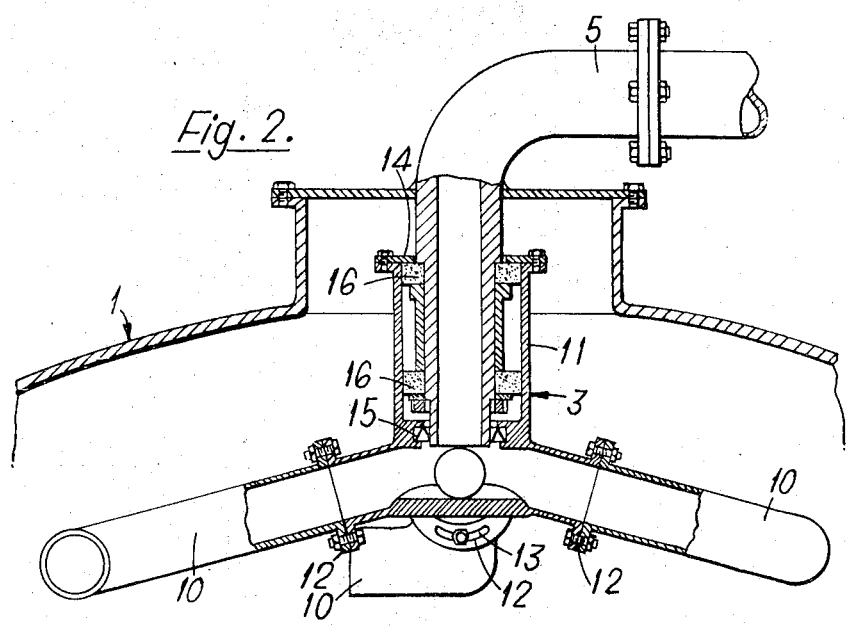
FIG. 2 is a section on the line II—II of FIG. 1.

From FIGS. 1 and 2 it will be seen that the plant consists substantially of a vat 1, a pump 2, a reaction rotor 3, a duct 4 which connects the base of the vat 1 to the inlet of the pump 2, a duct 5 which connects the outlet of the pump 2 to the rotor 3, a duct 6 which connects the outlet of the pump 2 to a trickle pressing plant, not shown in the figure, and valves 7, 8 and 9.

The rotor 3 is composed of L tubes 10 of various lengths, connected to the central cylindrical body 11 by the flange 12 provided with slots 13 which enable the tubes 10 to be positioned.

The cylindrical body 11, completed upperly by the flange 14 and lowerly by the seal ring 15, rests on the guide and thrust bushes 16.

The pump 2 is of the torque flow type and is characterised by a high throughput and an adequate head. It is constructed in such a manner as not to damage or crush the solid parts which pass through it with the liquid.

In the maceration stage the "pressed" product comprising the liquid must and pressed grape dregs is drawn in through the duct 4 and returned by the pump 2 to the vat at the top through the sprayer 3, which being provided with arms of various length and moving with rotational motion gives a fairly uniform flow of pressed product from the top towards the bottom of the vat.

In this manner there is a continuous renewal of contact between the must, the skins and the pressed grape dregs.

Consequently the maceration, and the relative dissolving of colour and salts into the wine, takes place very rapidly and completely, and terminates while the fermentation of the must is still in the initial stage. Immediately afterwards the valve 9 is closed and the entire contents are discharged into the trickle press machine by opening the valve 8. The entire operation takes place at low temperature with a minimum wastage of alcohol.

Figure 5:
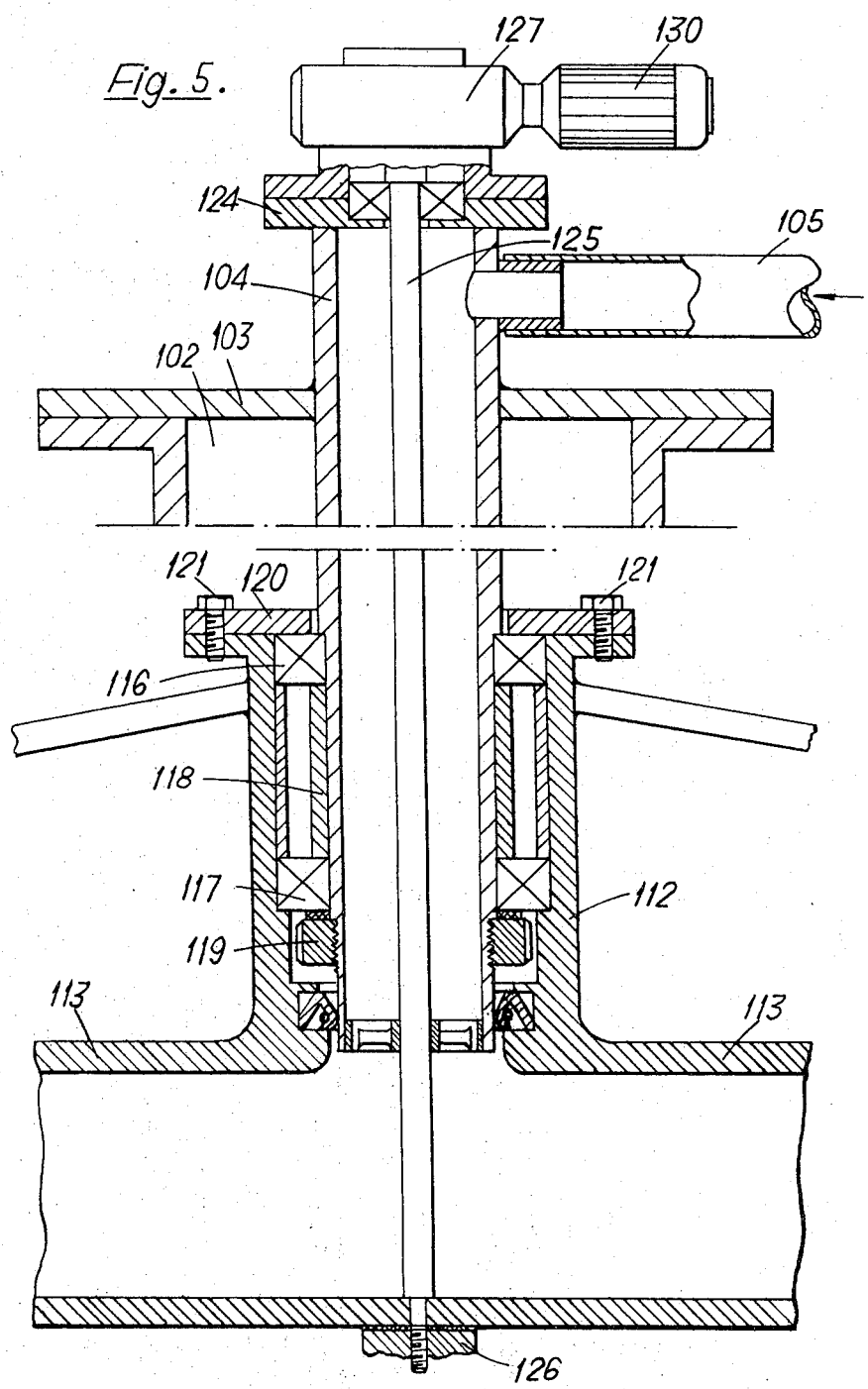
FIG. 5 is a vertical section through the support device for the sprayer unit.

The process described above may be more conveniently carried out by the improved plant shown in FIGS. 3 to 5.

This plant gives an improved withdrawal of liquid from the bottom of the vat because of the presence of at least two withdrawal pipes and a better distribution of liquid at the top of the vat because of a plurality of rotating feeders.

The figures show a vat 101 provided with a circular central aperture 102 closed by a flange 103 which is traversed by the section of fixed duct 104. To the sides of this duct there are the outlets of the delivery pipes 105 and 106 from the pumps 107 and 108 respectively, which are situated at the base of the vat 101.

The suction ducts 109 and 110 of these pumps are prolonged inside the vat 101 and are provided with a number of holes 111 so as to draw the pressed product in from the bottom of the vat at a number of points.

From the section of fixed duct 104 there is suspended in such a manner as to be able to turn, a second section of duct 112 from which two tubular arms 113 branch, at the ends of which are suspended rotational devices in the form of rotors with differentiated arms 114 and 115 which are identical to those provided in the previously described design.

The rotation of the section of duct 112 with respect to the duct 104 is allowed by a device analogous to that of the rotors 114 and 115.

This comprises thrust bushes 116 and 117 inserted into the pipe 104, separated by the cylindrical body 118 and clamped by the ring nut 119. On the upper bush rests the flange 120 which is clamped by the bolts 121 on to the upper end of the duct 112. The seal between the ducts 112 and 104 is made by the elastic ring 122 inserted in the cavity 123 of the duct 112.

The duct 104 is closed upperly by the flange 124 which is provided with a central hole through which the pivot 125 passes.

The pivot is fixed by the nut 126 to the bottom of the duct 112 and on its upperly projecting end is mounted the reduction unit 127 coupled to the electric motor 130 in such a manner as to transmit the rotational movement of this latter to the pivot 125 and hence to the duct 112 and arms 113. The rotors 114 and 115 are thus driven with a motion composed of their natural motion of rotation by reaction and a revolutionary motion about the axis of the pivot 125.

In this manner, by suitably sizing the arms 113 and rotors 114 and 115, the spray zone perfectly covers the entire surface of the head of skins and pressed grape dregs and the liquid distribution takes place in a perfectly uniform manner.

Because of the disposition of the holes 111, the intake of the pressed product from the bottom of the vat also takes place uniformly so guaranteeing the same treatment for the entire mass of liquid.

The invention is not limited to the embodiments described above and modifications and improvements may be made without leaving the scope of the invention, whose fundamental characteristics are summarised in the following claims.

What is claimed is:

1. A wine-making plant comprising at least one vat, a torque flow pump connected to a feed pipe leading to said vat; a sprayer with discrete arms, rotating by reaction, situated in the top part of the vat and comprising a plurality of L shaped tubes of various lengths connected, by means of a locating flange to a central cylindrical body, an upper closing flange carried by said body which rotatably rests on a centering and thrust bearing carried by said feed pipe; a further ring of elastic material situated in the lower zone of contact between the cylindrical body and the end of the feed pipe; a suction pipe, provided with a valve which connects the base of the vat to the pump inlet; and a pipe provided with a valve which connects the pump outlet to the inlet of a trickle pressing plant.

2. A plant as claimed in claim 1 in which the sprayer comprises two or more rotors with discrete arms mounted at the ends of a like number of substantially horizontal tubular arms branching from a single central manifold which in its turn is rotatable about a stationary manifold attached to the center of the lid of said vat and into which at least one delivery pipe from at least one pressed product recirculation pump feeds.

3. A plant as claimed in claim 2, in which the mobile manifold is rotatably connected to the stationary manifold by means of an upper flange on the mobile manifold which rests on a thrust bearing supported by a ring nut screwed on to the fixed manifold; a seal between the two manifolds being provided by a ring of a suitable synthetic material inserted in a cavity formed in one of said manifolds.

4. A plant as claimed in claim 3, in which said mobile manifold is driven by an electric motor through a worm which engages a gear wheel mounted on pivot means which traverses both the fixed manifold and mobile manifold and is fixed to the bottom of the mobile manifold.

5. A plant as claimed in claim 1, characterized in that the pump motor is adapted to rotate the pump at high speed during a spraying stage and at low speed to empty the vat.

6. A plant as claimed in claim 1, in which there are at least two pumps.

7. A plant as claimed in claim 6, in which the suction pipes of said pumps extend inside the bottom of the vat and are provided with a number of underlying intake holes uniformly distributed over the bottom of the vat.

* * * * *

UNITED STATES PATENT OFFICE
CERTIFICATE OF CORRECTION

PATENT NO. : 3,872,272
DATED : March 18, 1975
INVENTOR(S) : RENO MELANDRI

It is certified that error appears in the above-identified patent and that said Letters Patent are hereby corrected as shown below:

[30] Foreign Application Priority Data

Nov. 30, 1971 Italy .......... 46927

July 26, 1972 Italy .......... 46899

Signed and Sealed this eleventh Day of November 1975

[SEAL]

Attest:

RUTH C. MASON
*Attesting Officer*

C. MARSHALL DANN
*Commissioner of Patents and Trademarks*